C. H. SCHMIDT AND O. B. NORGREN.
LATHE.
APPLICATION FILED DEC. 6, 1918.
1,409,243.
Patented Mar. 14, 1922.
5 SHEETS—SHEET 1.
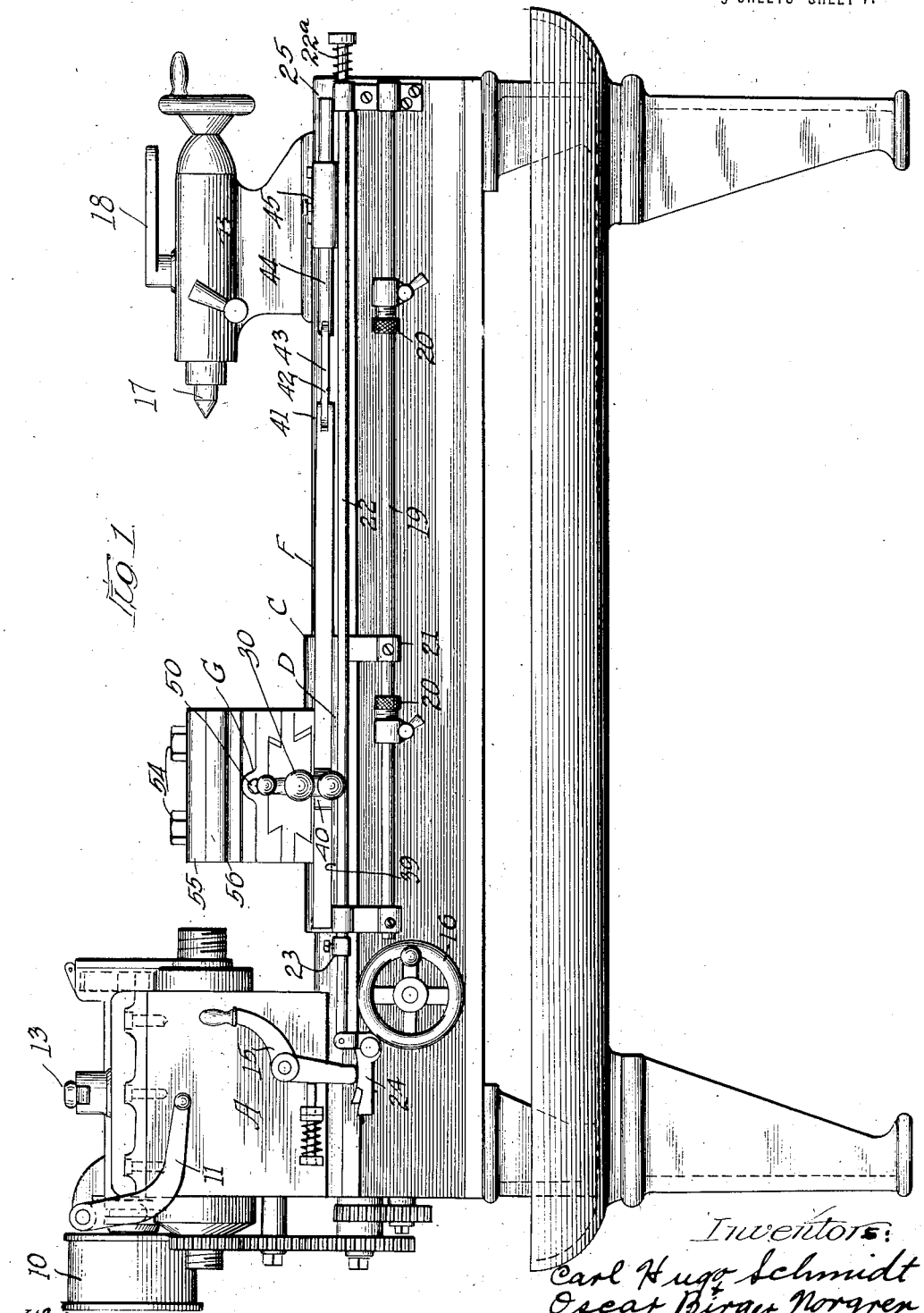

C. H. SCHMIDT AND O. B. NORGREN.
LATHE.
APPLICATION FILED DEC. 6, 1918.
1,409,243.
Patented Mar. 14, 1922.
5 SHEETS—SHEET 2.
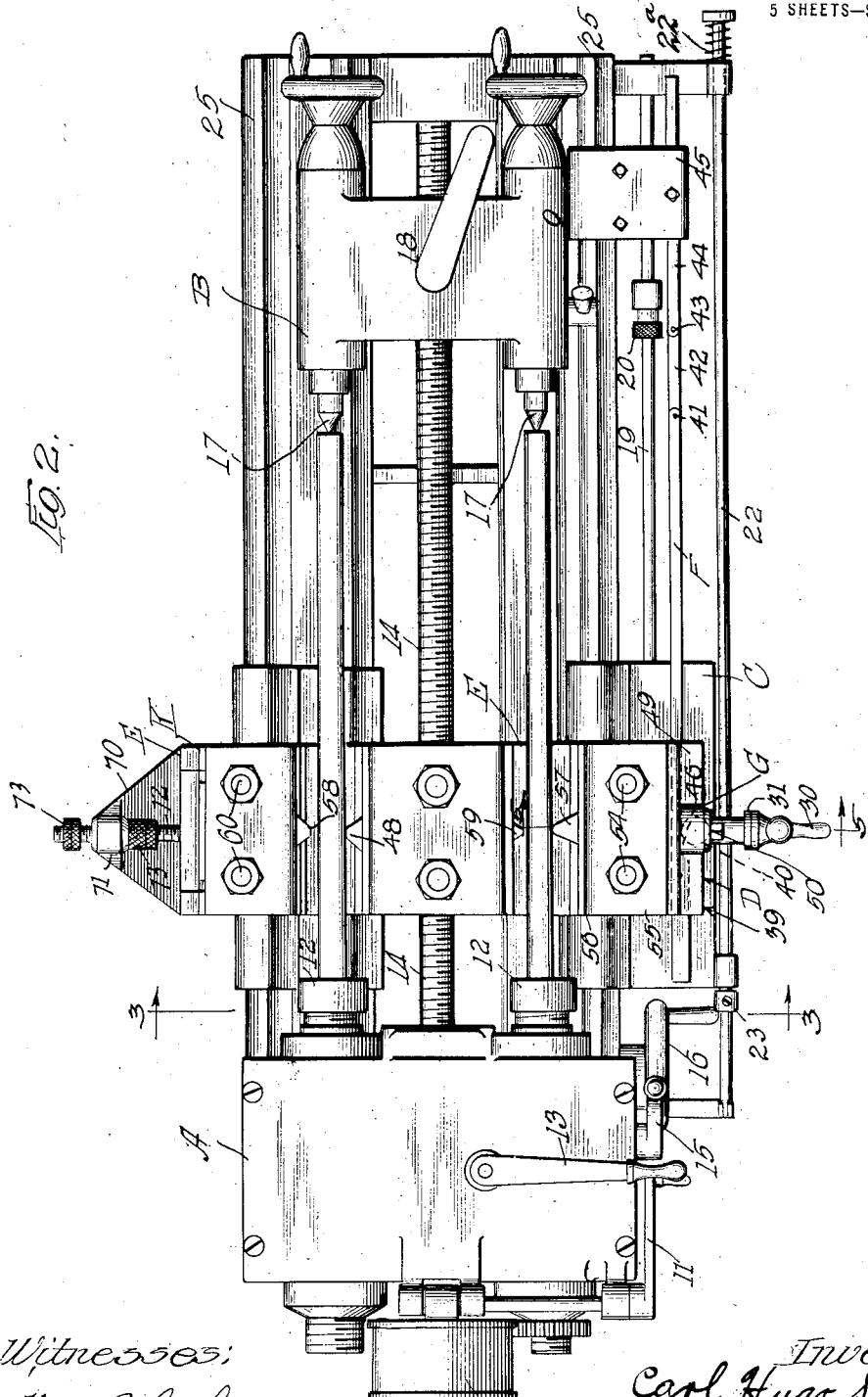

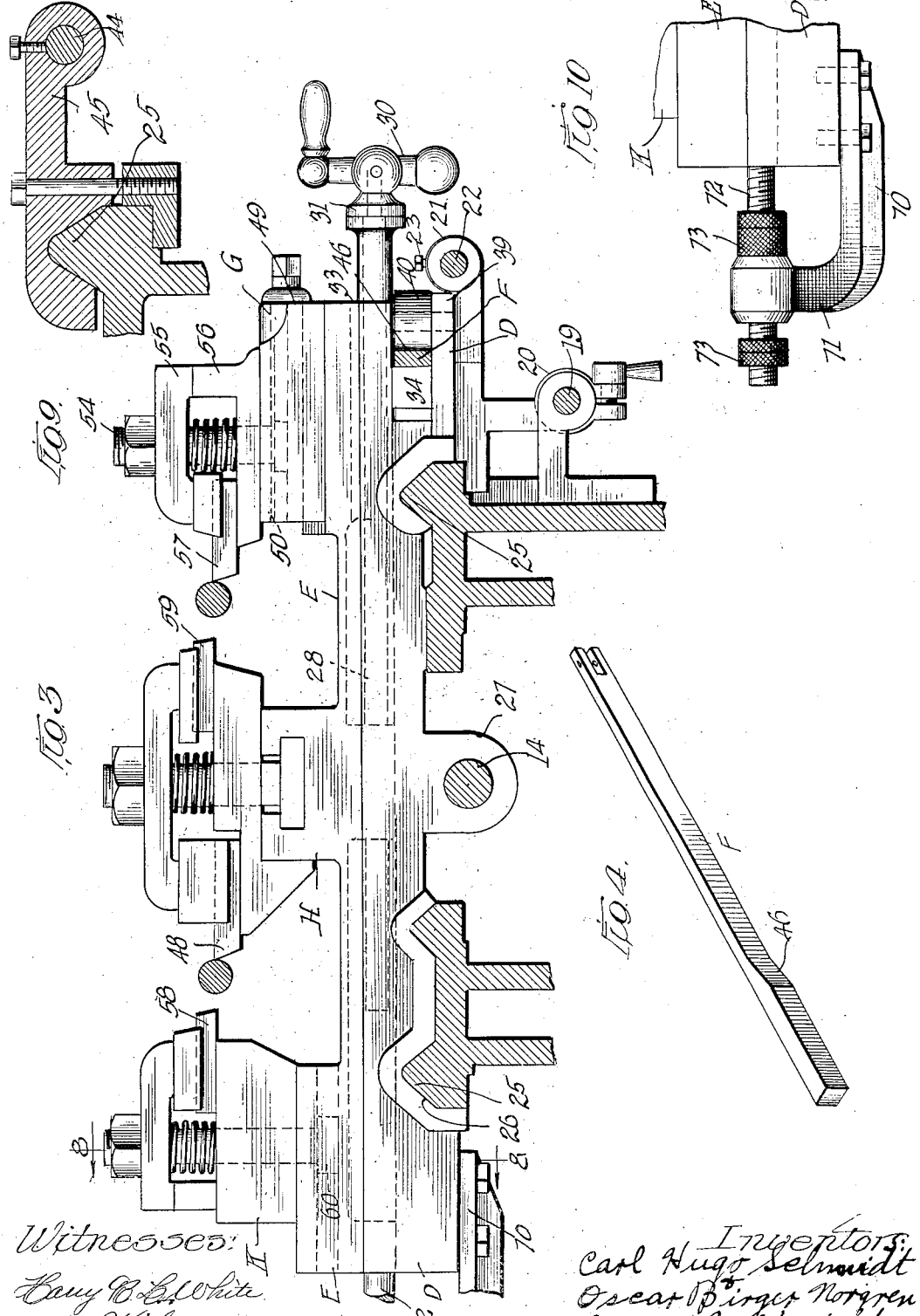

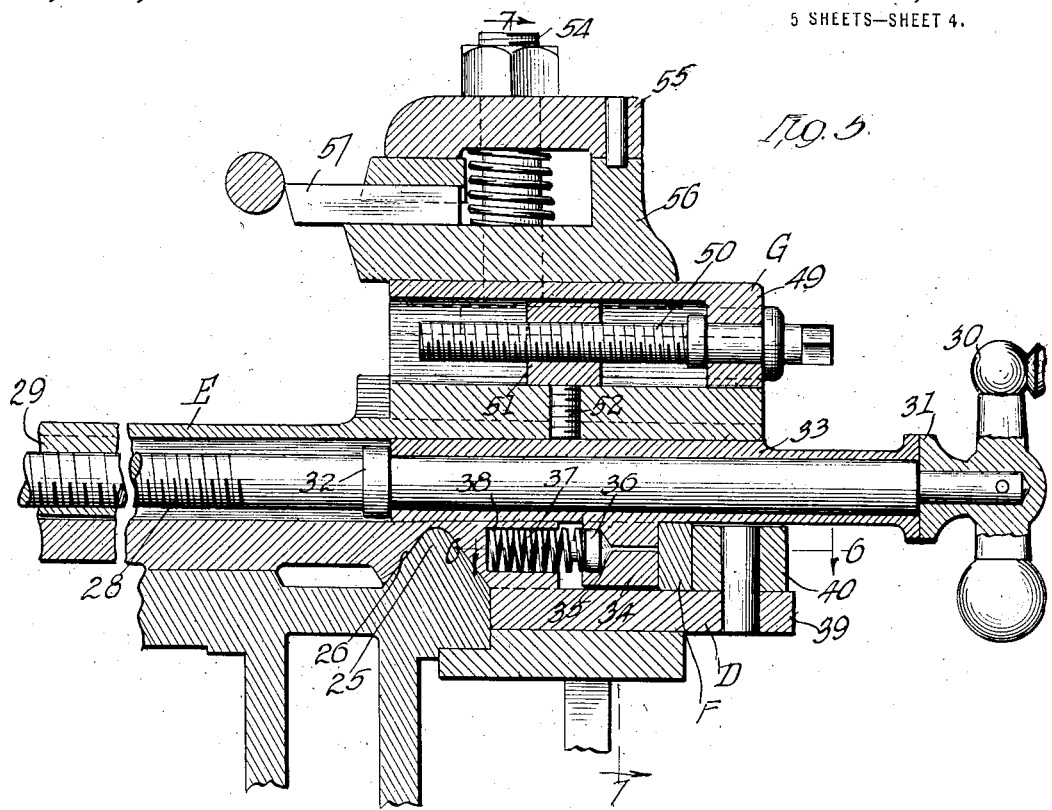
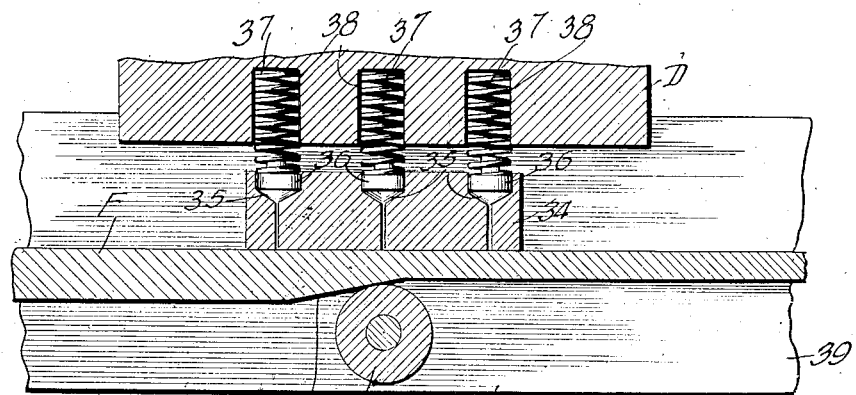

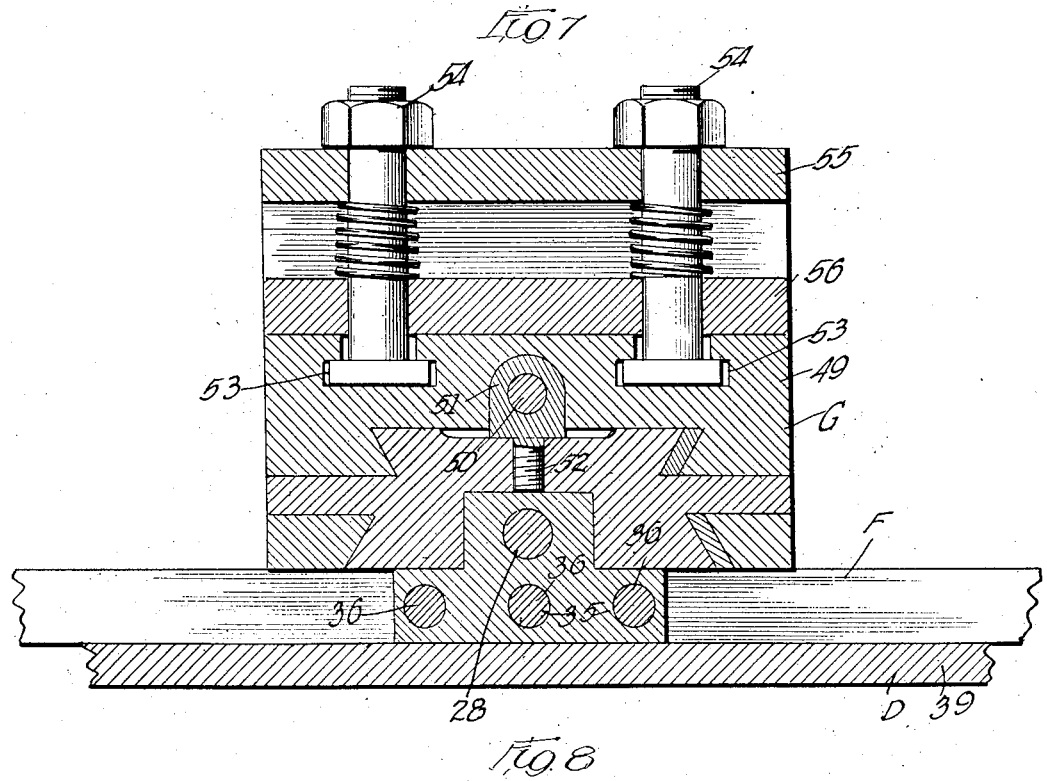

UNITED STATES PATENT OFFICE.

CARL HUGO SCHMIDT AND OSCAR BIRGER NORGREN, OF CHICAGO, ILLINOIS, ASSIGNORS TO SCHMIDT-NORGREN CO., OF CHICAGO, ILLINOIS, A CORPORATION OF ILLINOIS.

LATHE.

1,409,243.  Specification of Letters Patent.  Patented Mar. 14, 1922.

Application filed December 6, 1918. Serial No. 265,487.

*To all whom it may concern:*

Be it known that we, CARL H. SCHMIDT and OSCAR B. NORGREN, both citizens of the United States, residing at Chicago, Cook County, Illinois, have invented a certain new and useful Improvement in Lathes, of which the following is a specification.

This invention relates to improvements in lathes.

One object of the invention is to provide a lathe capable of finishing several times as much work as is now finished by the ordinary lathes, in substantially the same time and with substantially no greater attention or effort on the part of the operator.

Another object of the invention is to provide a lathe having means for automatically governing the positions of the cutting tools carried by the tool-carriage to thereby vary the depth of cuts made by the tools during the longitudinal and transverse movements of the tool-carriage so that quantity production of articles of uniform character is greatly facilitated and without special attention from the operator.

In a great deal of lathe work, articles of a more or less simple nature are turned out in large quantities. Where the lathe is provided with merely a single spindle and variations in the diameter or length of the articles produced are involved, the operator is required to devote his attention thereto during the entire cutting operation. With our improvements, several articles may be turned at the same time and a governing device is provided for automatically regulating the depth of the cutting tools in accordance with the formation of the article to be produced, so that the operator can turn out several times the amount of work which is now possible with the ordinary lathe and is furthermore assured of a uniform product without any special effort on his part, because of the governing device.

In the drawing forming a part of this specification, Figure 1 is a side elevation of a lathe embodying our improvements. Fig. 2 is a top plan view of the lathe shown in Fig. 1. Fig. 3 is an enlarged, vertical, transverse, sectional view, taken on the line 3—3 of Fig. 2 and showing the tool-carriage in elevation. Fig. 4 is a detail, perspective view of one form of governing bar employed with our invention. Fig. 5 is an enlarged, detail, sectional view, taken substantially on the line 5—5 of Fig. 2. Fig. 6 is a horizontal, detail, sectional view, taken substantially on the line 6—6 of Fig. 5. Figs. 7 and 8 are vertical, sectional views, taken substantially on the lines 7—7 of Fig. 5 and 8—8 of Fig. 3, respectively. And Fig. 9 is a detailed, sectional view, taken substantially on the line 9—9 of Fig. 2. Figure 10 is a detail view of an adjustable limiting device for the transverse movements of the tool carriage.

In said drawing, the lathe is shown as provided with a headstock A, tailstock B, and tool-carriage designated generally by the reference C. The lathe is operated by a belt through the pulley 10 and the pulley is adapted to be clutched with the other gearing of the lathe by any suitable means such as by the main clutch handle 11. The headstock is provided with a plurality of chuck spindles 12—12 geared by any suitable train of gears to rotate in unison and in the same direction, the gears being disposed within the headstock and driven from the pulley 10, as will be understood. Preferably, the gearing is of that character such that a speedy change may be made by any suitable means as by the speed-change clutch lever 13. The clutch for operatively connecting the tool-carriage feed screw 14 is controlled through the pivoted lever 15. The usual hand wheel 16 is provided to permit hand feeding of the tool-carriage, as will be understood. To co-operate with the multiple spindles of the headstock, the tailstock B is provided with corresponding spindles 17—17, the tailstock being adjustable lengthwise of the bed plate and adapted to be clamped in the usual manner, as by the lever 18. On the side of the lathe, as shown in Fig. 1, is provided a rod 19 on which are adjustably mounted stops 20—20 to limit the travel of the tool-carriage, which is provided with a depending arm 21 slidable along the rod 19 between the stops 20. Also, the lathe is preferably provided with a controlling rod 22 having an adjustable stop 23 thereon, said rod 22 operating through a bell-crank latch 24 to release the spring-actuated lever 15 to thereby throw out the clutch for the carriage feed screw. The controlling rod is normally held in its extreme position to the right, as viewed in Figure 1, by a spring 22ª.

The bed of the lathe is provided with preferably three guiding ribs, as indicated at 25—25 in Fig. 3 for the tool-carriage. The tool-carriage, as shown, comprises a main base member D and a superimposed member E. The main base member D is provided with suitable V-grooves 26 cooperable with the guiding ribs of the bed of the lathe so that the main base member of the tool-carriage is restricted to a movement lengthwise of the lathe. This lengthwise movement is, of course, accomplished by means of the feed screw 14 which engages a suitable depending threaded nut section 27 on the member D. The member E of the carriage is adjusted as an entirety transversely of the main member D by a transverse hand feed screw 28. Said screw 28 engages a threaded nut section 29 on the member E, as clearly shown in Fig. 5 and said screw is provided at its outer end with the usual handle 30. Said screw is provided with shouldered sections as indicated at 31 and 32 to prevent said screw from moving axially relatively to the plate 33.

Said plate 33 is provided with an integral depending section 34 which engages the inner face of a longitudinally extending governing bar F. Said depending section 34 of the plate 33 is provided with a plurality of sockets 35—35 within which are seated spring-pressed buttons 36, the other ends of the springs 37 being seated in suitable sockets 38 formed in the main base member D of the tool-carriage, as clearly illustrated in Figs. 5 and 6. In this manner, it is evident that the springs 37 serve to maintain the depending section 34 of the plate 33 in close contact with the inner face of the governing bar F. The main base member D of the tool-carriage is provided with an outstanding flange 39, (see Fig. 5) on which is rotatably mounted an anti-friction roller 40 which engages the opposite or outer face of the governing bar F.

The governing bar F is pivotally connected, as indicated at 41, to a relatively short link 42, which in turn is pivotally connected, as indicated at 43, to a rod 44. The rod 44 is adjustably secured to a clamp plate 45, (see Fig. 9) the clamp plate 45 in turn being suitably attached to a fixed portion of the lathe, as also indicated in said Fig. 9. By referring to Fig. 4, it will be noted that the governing bar is tapered, as indicated at 46. The governing bar, as shown, is that which would be used to turn out a product having the end portions thereof of different diameters and connected by a tapered portion corresponding to the taper of the bar F. As will be understood by those skilled in the art, the governing bar shown is merely illustrative of one form and it is obvious that other types of governing bars or cam plates could be used in accordance with the formation of the work turned out.

With the arrangement shown, it is evident that as the tool-carriage is fed from the tailstock end of the lathe toward the headstock and while traveling along the reduced portion of the bar F, there will be no relative transverse movement between the main base member D and member E of the carriage. When, however, the carriage approaches the tapered portion 46 of the bar F, relative transverse movement between the members D and E of the carriage will be enforced against the action of the springs 37 so that the member E will be moved to the left, as viewed in Fig. 3, in accordance with the variations in horizontal width of the bar F and in this way the tools carried by the carriage are governed automatically as the carriage travels lengthwise of the lathe.

In the lathe shown, two spindles are employed and accordingly the tool-carriage is provided with three sets of tool-carrying posts. One of these tool-carrying posts is designated as G, another as H, and the third as K in Fig. 3. The tool post H is made preferably integral with the member E of the tool-carriage so that the tool 48 is moved in unison with the member E. The tool post G is made adjustable with respect to the member E and for this purpose comprises a block 49 which is slidably connected with the member E by a suitable tongue and groove connection. To adjust the block 49 independently of the member E, a transverse feed screw 50 is swiveled in the block 49 and engages a threaded nut 51 which is preferably screwed into the member E, as indicated at 52 in Fig. 5. The block 49 is provided with the usual T-slots 53 to receive the clamping bolts 54, the bolts coacting with the tool clamping plates 55 and 56 to securely hold the cutting tool 57. With the arrangement just described, it is evident that the operator adjusts the tool-carriage manually so that the tool 48 is brought to the correct position. Then the tool 57 is independently adjusted so that both cutting tools are spaced apart the proper distance to work on the two pieces of stock simultaneously and uniformly.

The tool post K, in actual practice, will not be provided with the screw thread adjusting means such as employed with the tool post G, but on the contrary, the post K will be adjusted through the clamping bolts 60. As shown, the tool post K has the usual clamping arrangement for a tool 58 and the latter on the post K may be adjusted with respect to the tool 59 carried by the center tool post H so that the tools 58 and 59 will be the correct distance apart.

As shown in Figs. 2, 3 and 10, we have provided an adjustable means for limiting or governing the relative movement between the members D and E of the tool-carriage. As shown, said means comprise a bracket 70 rigidly secured to the member D of the tool-carriage, said bracket having an upstanding arm 71 through which is slidably movable a screw 72 affixed to the member E of the tool-carriage. The screw 72 has two sets of locking or jam nuts 73—73 thereon disposed on opposite sides of the upstanding arm 71. As will be apparent, the sets of locking nuts 73 can be adjusted as desired on the screw 72 so as to limit the movement of the member E relatively to the member D of the tool-carriage in a transverse direction. This is of especial importance in turning out a number of articles of similar form after the tools have once been properly adjusted on the tool-carriage.

Referring to the governing bar F, it will be noted that the same can be adjusted lengthwise of the lathe so as to bring the tapered section thereof at any desired point in the stock being turned. Furthermore, by mounting the governing bar through the intermediary of the link 42, the inner face of the bar F can be maintained parallel to the line of movement of the tool-carriage and in true surface contact with the depending section 34, as shown most clearly in Fig. 6. It will be evident to those skilled in the art that the arrangement of cutting tools and stock operated upon is such as to normally force the member E toward the anti-friction roller 40 and consequently that the springs 37 are not entirely relied upon for this purpose. The springs 37 will take care of any tendency of the member E of the carriage to shift accidentally toward the left as viewed in Figs. 3 and 5.

Throughout the description and in the drawings, we have referred merely to a single cutting or turning tool mounted on each tool post. This is merely illustrative since it is evident that a plurality of turning or cutting tools may be secured in each tool holder and several turning or cutting operations carried on simultaneously when the tool-carriage is fed either longitudinally or transversely and we therefore do not wish to be limited to the number of tools shown in the drawings.

Although we have herein shown and described what we now consider the preferred manner of carrying out our invention, the same is merely illustrative and we contemplate such changes and modifications as come within the terms of the claims appended hereto.

We claim:

1. In a lathe, the combination with multiple spindle head and tailstocks and operating mechanism; of a tool-carriage, said tool-carriage comprising a main base member directly slidable on guiding ribs lengthwise only of the lathe and for substantially the entire distance between the head and tailstocks, and a second member carried by said base member; a plurality of tool holders carried by said second member and corresponding in number to the number of spindles; means for manually adjusting said members transversely relatively to each other; and a governing bar co-operable with and engaging both members of said carriage and adapted automatically to adjust the tool holding member of the carriage relatively to the base member as the carriage travels lengthwise of the lathe.

2. In a lathe, the combination with two spindle head and tailstocks and driving mechanism; of a tool-carriage including a base member and a superimposed tool-carrying member adjustable transversely thereof, said tool-carriage being slidable from head to tailstocks and vice versa; and a manually operable adjusting screw for adjusting the tool carrying member to a predetermined position relatively to the base member; a governing bar adapted automatically to effect adjustment between said members of the carriage as the latter moves lengthwise of the machine; a plurality of tool posts carried by said tool-holding member; and screw means for adjusting one of said tool posts transversely relatively to the tool-carrying member.

3. In a lathe, the combination with multiple spindle head and tailstocks and operating gearing including a feed screw for the tool carriage, of a tool carriage comprising a main base member limited to movement lengthwise of the lathe and a member superimposed on said base member, means for adjusting to a predetermined position, said superimposed member on the base member transversely of the lathe, said superimposed member being provided with a plurality of tool holders, each adapted to hold a tool in position to operate on the work supported by the different spindles, and means for adjusting one of said tool holders as an entirety, transversely relatively to said superimposed member to thereby adjust the operative distance between the tool holders independently of any adjustment of the tools proper.

4. In a lathe, the combination with multiple spindle head and tailstocks and operating mechanism including a tool carriage feed screw, of a tool carriage, said carriage including two members movable lengthwise of the lathe in unison and relatively adjustable transversely of the lathe, a transverse adjusting screw for effecting adjustment between said members to maintain them in a predetermined relation, a plurality of tool holders carried by one of said members and provided with means for holding the tools extending in the same direction for operating on a plurality of pieces of work simultaneously, and an adjusting screw for adjusting one of said tool holders as an entirety relatively to the member by which it is carried and independently of the adjustment of any tool proper with respect to its tool holder.

5. In a lathe, the combination with a governing bar extending lengthwise of the lathe, said bar being shaped in accordance with the work to be produced, and a tool carriage slidable as an entirety lengthwise of the lathe, said tool carriage comprising, a base member restricted to movement lengthwise of the lathe, a superimposed tool carrying member directly transversely slidably mounted on said base member, a block also slidably mounted on said base member, and an adjusting screw between said block and superimposed member, said base member having an upstanding portion and said block a depending portion between which the governing bar extends, said superimposed tool carrying member and block being relatively adjustable transversely of the lathe directly on said base member in accordance with the horizontal width of the bar as the carriage travels as an entirety parallel to the bar.

6. In a lathe, the combination with two spindle head and tailstocks and operating mechanism, of a tool carriage, said tool carriage including a base member restricted to movement lengthwise of the lathe and a superimposed tool carrying member movable lengthwise in unison with the base member, means for adjusting said superimposed member as an entirety transversely of the lathe, said superimposed member having a tool carrying post at its outer end, means for adjusting said tool carrying post as an entirety transversely relatively to said superimposed member, said superimposed member having also a centrally disposed tool carrying post rigid with respect thereto and extending up between the pair of spindles.

7. In a lathe, the combination with two spindle head and tailstocks and operating mechanism, of a tool carriage, said tool carriage including a base member restricted to movement lengthwise of the lathe and a superimposed tool carrying member movable lengthwise in unison with the base member, means for adjusting said superimposed member as an entirety transversely of the lathe, said superimposed member having a tool carrying post at its outer end, means for adjusting said tool carrying post as an entirety transversely relatively to said superimposed member, said superimposed member having also a centrally disposed tool carrying post rigid with respect thereto and extending up between the pair of spindles, and means for automatically varying the position of said superimposed member with all the parts carried thereby transversely relatively to said base member, as the carriage moves as an entirety lengthwise of the lathe.

8. In a lathe, the combination with the head and tailstocks and operating gearing, of a tool carriage having a base member restricted to movement lengthwise of the lathe, a block slidably mounted on said base member, spring means interposed between said block and base member, a superimposed tool carrying member, a transverse adjusting screw between said block and superimposed member; and a governing bar pivotally attached at one of its ends to the lathe proper, said bar extending between opposed portions of said block and said base member of the tool carriage and adapted to effect relative transverse movement between said block and base member against the action of said spring means.

In witness that we claim the foregoing, we have hereunto subscribed our names this 18th day of November, A. D. 1918.

CARL HUGO SCHMIDT.
OSCAR BIRGER NORGREN.